No. 878,628. PATENTED FEB. 11, 1908.
W. A. HEUBLEIN.
PLANTER.
APPLICATION FILED OCT. 8, 1907.
5 SHEETS—SHEET 1.
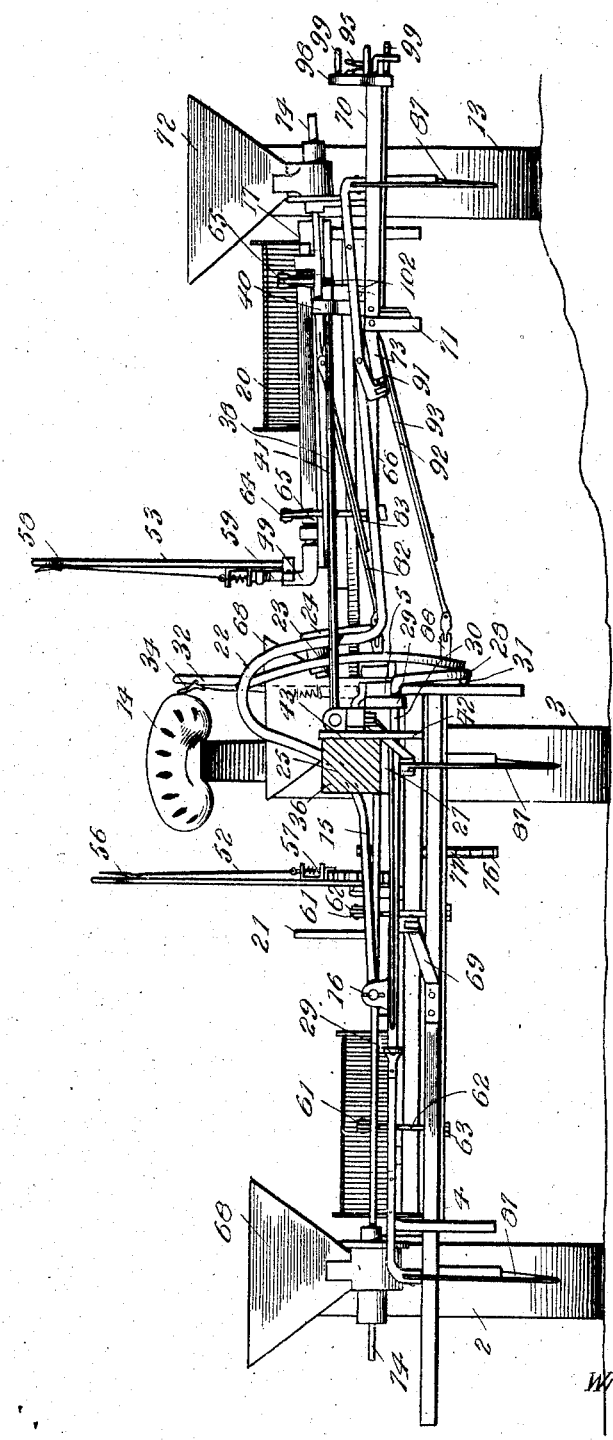
Witnesses
W. A. Williams
Inventor
William A. Heublein
By
Dudley, Browne & Phelps.
Attorneys

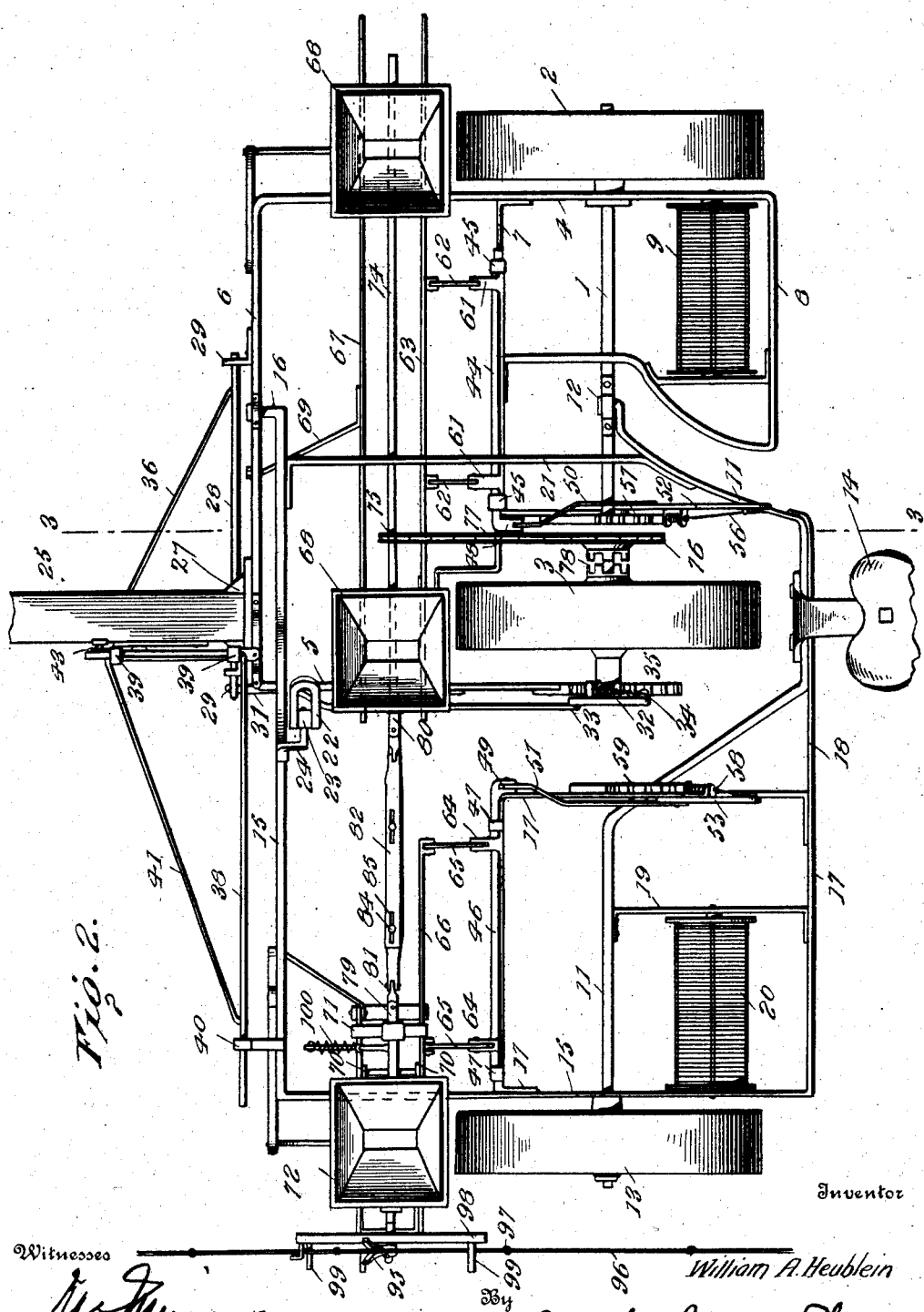

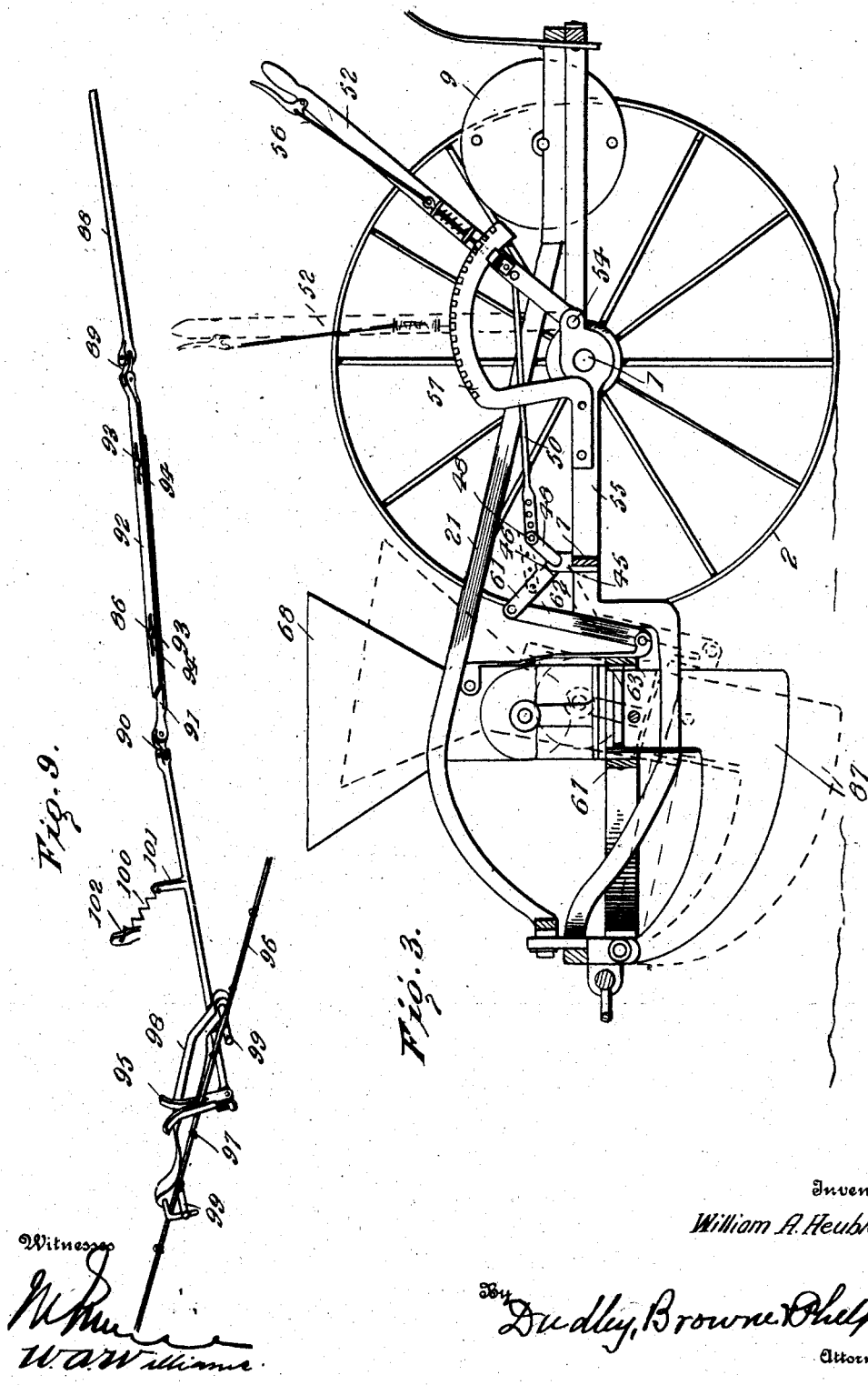

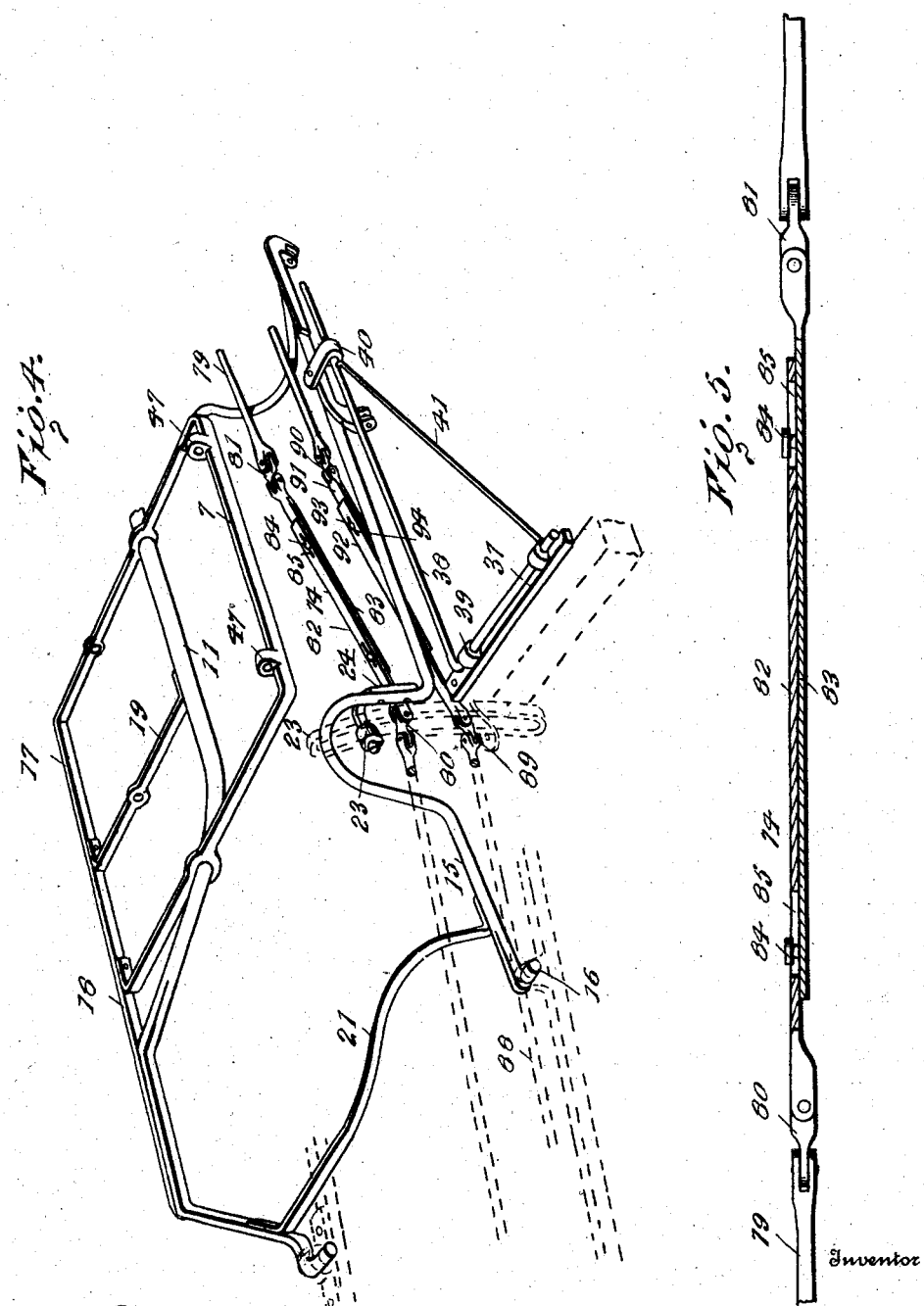

No. 878,628. PATENTED FEB. 11, 1908.
W. A. HEUBLEIN.
PLANTER.
APPLICATION FILED OCT. 8, 1907.
5 SHEETS—SHEET 5.
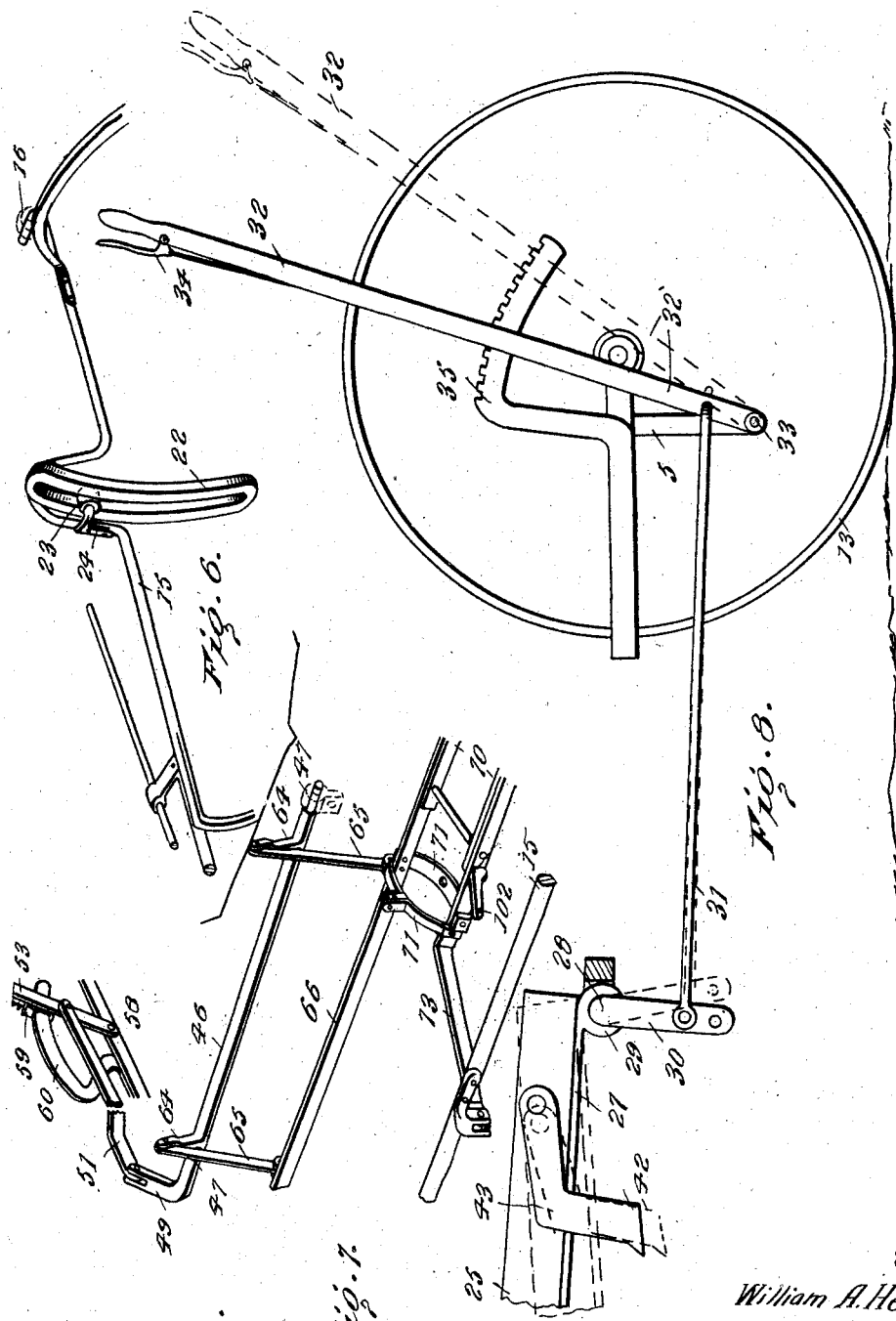
Inventor
William A. Heublein
Witnesses
By Dudley, Browne & Phelps.
Attorneys

UNITED STATES PATENT OFFICE.

WILLIAM A. HEUBLEIN, OF WILSON, MINNESOTA.

PLANTER.

No. 878,628.

Specification of Letters Patent.

Patented Feb. 11, 1908.

Application filed October 8, 1907. Serial No. 396,440.

*To all whom it may concern:*

Be it known that WILLIAM A. HEUBLEIN, a citizen of the United States, residing at the town of Wilson, in the county of Winona and State of Minnesota, has invented certain new and useful Improvements in Planters, of which the following is a specification.

My invention relates to certain new and useful improvements in machines for planting corn or similar seeds, and the principal object of my invention is to provide a three row planter which will adjust itself to the inequalities of the ground without materially affecting the distances between the rows being planted.

A further object of my invention is to provide an improved construction by which the depth to which the seeds are planted can be readily adjusted.

With these and other objects in view my invention consists in certain constructions, arrangements and combinations of parts, the preferred form of which will be first described in connection with the accompanying drawings, and then the invention particularly pointed out in the appended claims.

Referring to the drawings wherein I show the preferred form of my invention and wherein the same part is designated by the same reference numeral wherever it occurs: Figure 1 is a front elevation of a three row corn planter embodying my invention and showing the parts in the position they occupy when one of the outside wheels is running on a level above that of the other wheel; Fig. 2 is a top plan view; Fig. 3 is a section taken on line 3, 3 of Fig. 2; Fig. 4 is a perspective view of a portion of the frame with the parts removed therefrom to more clearly illustrate the construction. Fig. 5 is a detail view, partly in section, of a portion of the shaft which passes through all the seed hoppers; Fig. 6 is a detail perspective view of a part of the connections between the two portions of the frame; Fig. 7 is a detail perspective view of a portion of the raising and lowering means for the seeders and Fig. 8 is a detail view in side elevation, showing the means for raising and lowering the pole to vary the depth the furrow openers are driven into the ground. Fig. 9 is a detail perspective view showing the check row operating mechanism.

1 designates a shaft or axle on which are mounted the wheels 2, 3. Secured to the shaft 1, inside the wheel 2 and outside the wheel 3, is the main supporting frame which consists of two sections 4 and 5, the inner ends of which are connected to the shaft 1, and the outer ends extending toward the front of the machine where they are connected by the section 6. Preferably and, as shown, this frame is formed of one bar bent into the required form.

7 is a cross brace extending between the bars 4 and 5 parallel with the shaft 1, and 8 is a frame extending rearward and connected at one side to the section 4 of the main frame, and with its other end secured to the brace 7. This frame forms a support for a reel 9 on which the check row chain can be wound.

11 designates a bar which is pivotally mounted at one end in a bearing 12 mounted on the shaft 1 between the wheels 2 and 3. This bar extends rearwardly to pass around behind the wheel 3 and then forwardly until it is in the plane of the shaft 1 and then in line with the shaft 1 to form an axle for the third supporting wheel 13. Preferably immediately behind the wheel 3 I mount the driver's seat 14 upon the bar 11.

15 designates a bar secured at one end to the bar 11, inside of the hub of the wheel 13, the bar extending forwardly and then at right angles so as to run parallel to the shaft 1, with its end mounted in a bearing 16 on the section 6 of the main frame. The bearing 16 is in line with the bearing 12, so that the frame is free to move up and down in relation to the main frame swinging upon the bearings 12 and 16, or the main frame which carries the two supporting wheels 2 and 3 can oscillate on the bearings 12 and 16, whereby the wheels and frames will accommodate themselves to any unevenness in the ground over which they travel.

17 is a substantially rectangular frame mounted upon the bars 11 and 15, and extending forwardly and rearwardly of the portion of the section of the bar 11 which is in line with the shaft 1.

18 is a brace connecting the frame 17 of the portion of the bar 11 to which the seat 14 is attached.

19 is a brace extending from the rear portion of the frame 17 to the bar 11, and between the brace 19 and the side of the frame 17 I preferably mount a reel 20 which is adapted to carry a length of check row chain.

21 is a brace which extends from a portion of the bar 15 adjacent to the bearing 16 back to the portion of the bar 11 adjacent to the bearing 12, so as to complete the rectangular form of the frame and give it the necessary strength and rigidity.

22 is a link mounted upon the portion 5 of the main frame and extending upwardly and downwardly adjacent to the front portion of the bar 15.

23 is a roller mounted upon a projection 24 secured to the bar 15, the roller working in the slot in the link, so as to maintain the two frames in proper alinement.

25 is the pole which is secured to a plate 27 carried by a shaft 28 mounted in journals 29, mounted upon the portion 6 of the main frame.

30 is an arm extending downwardly from the shaft 28 and connected by a link 31 to a lever 32 pivoted at 33 on the portion 5 of the main frame. This lever is provided with the ordinary latch mechanism 34 adapted to engage a notched segment 35 also mounted on the portion 5 of the main frame.

36 is a brace which extends from the shaft 28 to the plate 27.

37 is a brace extending out from the portion 6 of the main frame parallel to the pole and adjacent to its side.

38 is an L-shaped bar, one portion of the bar being journaled in bearings 39 on top of the brace 37, the end of the other portion of the bar 38 loosely passing through a lug 40 mounted upon the bar 15.

41 is a brace extending from the portion of the rod 38 adjacent to the lug 40 to the portion of the rod in front of the forward bearing 39, thus forming a triangular bracing section which operates to prevent lateral movement of the pole in one direction, the brace 36 operating with the shaft 28 and the plate 27 to prevent lateral movement in the other direction.

42 designates a knee-shaped plate secured to the side of the pole with the forward edge of which a stud 43 projecting from the side of the brace 37 engages to guide the pole in its upward and downward movement under the influence of the lever 32.

44 designates a shaft mounted in bearings 45 mounted upon the brace 7 of the main frame, and 46 designates a shaft mounted in bearings 47 on the forward section of the rectangular frame 17.

48 and 49 are rock arms extending up from the inner ends of the shafts 44 and 46, and these rock arms are respectively connected by means of links 50, 51 to levers 52, 53, the lever 52 being pivoted at 54 on a brace 55 between the cross bar 7 and the shaft 1. This lever carries the ordinary latch mechanism 56 which engages with a notched segment 57 also carried by the brace 55. The lever 53 is similarly pivoted at 58, and is provided with a latch mechanism 59 engaging a notched segment 60. Extending forwardly from the shaft 44 are a pair of arms 61 which are pivotally connected by means of the links 62 to a bar 63. The shaft 46 is provided with a pair of forwardly extending arms 64 which are pivotally connected by means of the link 65 to a bar 66.

67 is a bar parallel to the bar 63 and connected thereto by the sides of the pair of seed hoppers 68, 68, these bars with the seed hoppers forming a rectangular frame.

69 is a brace which extends from the bars 67 to the section 6 of the main frame.

70 is a bar which is secured to the bar 66 by means of the pair of U-shaped braces 71, 71, and also the sides of the seed hoppers 72.

73 is a brace which connects the end of the bar 70 with the bar 15.

74 is a shaft passing through all the seed hoppers 68, 68 and 72, the shaft being provided with a sprocket wheel 75 in line with a sprocket 76 mounted upon the shaft 1.

77 is a sprocket chain connecting the two sprocket wheels.

Preferably the sprocket wheel 76 is connected to the wheel 3 by means of a clutch 78 as shown, the clutch being of any ordinary or desired character.

The shaft 74 is preferably formed as best shown in Fig. 5 and, as therein shown, is composed of a solid section 79 extending between the pair of seed hoppers 68. Between the central seed hopper 68 and the seed hoppers 72 I provide a pair of universal joints 80 and 81. The section of the shaft between the joints 80 and 81 is preferably formed of two flat sections 82 and 83, the section 82 extending from the joint 80 and the section 83 from the joint 81. These sections are connected together by means of headed pins 84 extending from one of the sections and passing through slots 85 in the other section, whereby the distance between the universal joints 80 and 81 can vary to accommodate the various positions of the two frames in relation to each other, the two universal joints permitting of the rotation of the shafts in whatever position the two frames may occupy.

86 is the check row shaft, which extends through the upper portion of the furrow openers 87, which extend down from the seed hoppers. The construction of this shaft is preferably similar to the construction of the shaft 74, and, as best shown in Fig. 9, is provided with the solid section 88 which extends between and through the furrow openers of the pair of seed hoppers 68, and between the central hopper 68 and the hopper 72 is provided with universal joints 89, 90, similar to the joints 80, 81, and 91, 92 are two flat sections extending between the joints 89 and 90 and similarly connected together by the headed pins 93 carried by one member, extending through slots 94 in the other member. Pivoted on one end of the shaft 86 is the fork 95 with which the projections on the check row chain 96 are adapted to engage to operate the shaft in the usual manner.

97 is a stop supported on a cross bar 98 carried on the ends of the bars 66 and 77, this bar being provided with guides 99 for the check row chain.

100 is a spring secured at one end to an arm 101 on the check row shaft, the other end of the spring being attached to a lug 102 carried by the bar 70, whereby the fork 95 is normally held against the stop 97.

From the above described construction it will be seen that I have produced a planter for corn or other seeds which is composed of two main supporting frames, one of said frames being carried by the pair of wheels 2, 3, while the other frame is supported at one end by the wheel 13, the other end of the second frame being pivoted to the first frame at the central portion thereof between the wheels 2, 3.

It will thus be seen that when the planter is passing over uneven ground the wheel 13 can ride up or down with relation to the wheels 2, 3, without throwing the seed feeding devices supported on the main frame out of alinement and without materially affecting the alinement between the seed feeding devices carried by the main frame and the pivoted frame.

It will also be apparent that the wheels 2 and 3 carrying the main frame can oscillate up and down to accommodate unevenness of the ground without affecting the seed feeding devices carried by the pivoted frame and without affecting the alinement between the seed feeding devices carried by the main frame.

The construction of the seed hopper shaft and the check row shaft is such that this yielding of the two frames in relation to each other is effected without interfering with their operation.

While I have described what I believe to be the preferred form of my invention, I desire to have it understood that many changes may be made in the form, construction and arrangement of parts without departing from the spirit of my invention.

What I claim as new and desire to secure by Letters Patent is

1. In a planter, the combination with a frame, of a pair of wheels supporting the frame, a second frame pivoted to the first frame between the wheels thereof, a third wheel mounted upon said second frame, and seed feeding devices supported by said frames.

2. In a planter the combination with a frame, a pair of wheels supporting the frame, a second frame pivoted at one end to said first frame and between the wheels, a third wheel mounted on the other end of said second frame and seed feeding devices supported by said frames.

3. In a planter, the combination with a frame, of a pair of wheels supporting the frame, a second frame pivoted to the first frame between the wheels thereof, a third wheel mounted upon said second frame, seed feeding devices supported by said frames, and a shaft passing through all the seed feeding devices, said shaft being provided with means to permit the movement of the seed feeding devices in relation to each other.

4. In a planter, the combination with a frame, of a pair of wheels supporting the frame, a pair of seed feeding devices carried by said frame, means connecting said pair of seed feeding devices with the frame whereby they may be raised and lowered, a second frame pivoted to the first frame between the wheels thereof, a third wheel mounted upon said second frame, a third seeding device carried by said second frame, and means connecting said third seeding device with said second frame whereby it may be raised and lowered.

5. In a planter the combination with a frame, of a pair of wheels supporting the frame, a second frame pivoted to the first frame between the wheels thereof, a third wheel mounted upon said second frame, a pair of seed feeding devices, a supporting frame in which said seed feeding devices are mounted, connection between said first frame and said supporting frame for raising and lowering said seed feeding devices, a third seeding device, a second supporting frame in which said third seeding device is mounted, and connections between said second frame and said second supporting frame for raising and lowering said third seeding device.

6. In a planter the combination with a frame, of a pair of wheels supporting the frame, a second frame pivoted to the first frame between the wheels thereof, a third wheel mounted upon said second frame, a pair of seed feeding devices, a supporting frame in which said seed feeding devices are mounted, connections between said first frame and said supporting frame for raising and lowering said seed feeding devices, a third seeding device, a second supporting frame in which said third seeding device is mounted, and connections between said second frame and said second supporting frame for raising and lowering said third seeding device, and a rotatable shaft passing through all the seed feeding devices, said shaft being provided with means to permit the movement of the seed feeding devices in relation to each other.

7. In a planter the combination with a frame, of a pair of wheels supporting the frame, a second frame pivoted to the first frame between the wheels thereof, a third wheel mounted upon said second frame, seed feeding devices supported by said frames, a pole pivoted to said first frame and means carried by said pole and first frame for adjusting said pole vertically in relation to said second frame.

8. In a planter the combination with a frame, of a pair of wheels supporting the frame, a second frame pivoted to the first frame between the wheels thereof, a third wheel mounted upon said second frame, a link carried by one of said frames and a part carried by the other frame engaging the link to guide the frames in their relative movements and seed feeding devices supported by said frames.

In testimony whereof I affix my signature in presence of two witnesses.

WILLIAM A. HEUBLEIN.

Witnesses:
D. E. TAWNEY,
MAUDE R. WHITE.